Dec. 5, 1933.                G. SEABERG                1,937,793
                            SADDLE GASKET
                         Filed Feb. 7, 1930
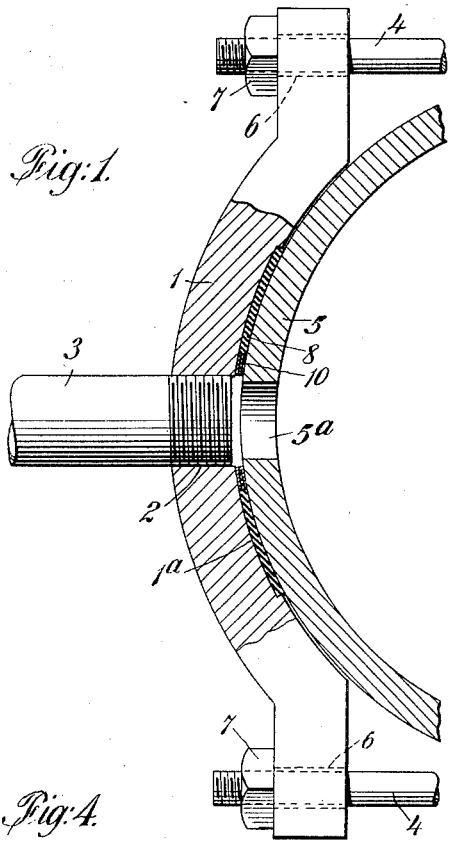
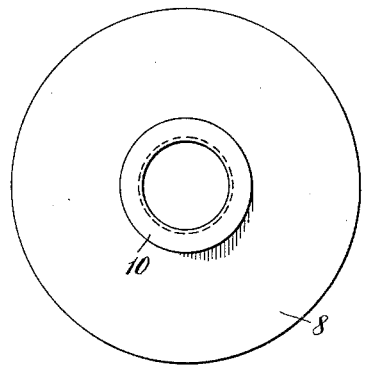
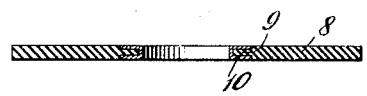
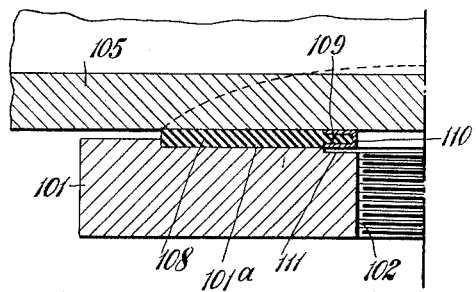
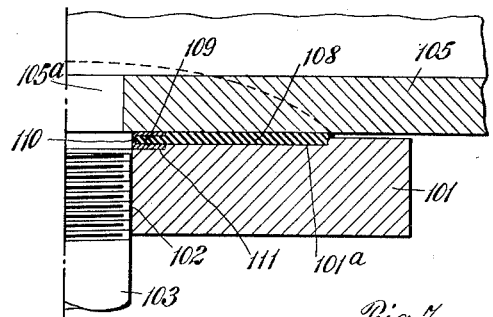
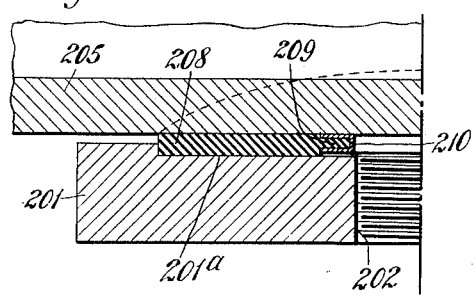
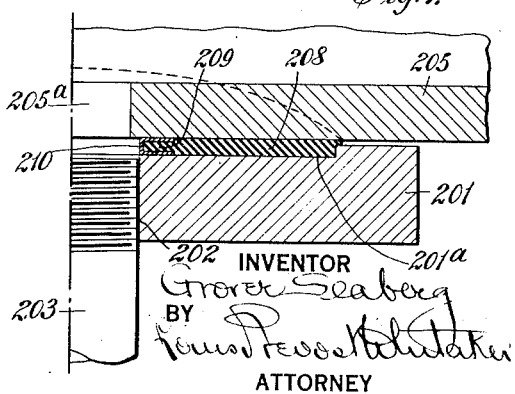
INVENTOR
Grover Seaberg
BY
Louis Prevost Whitaker
ATTORNEY Patented Dec. 5, 1933

1,937,793

UNITED STATES PATENT OFFICE 1,937,793

SADDLE GASKET

Grover Seaberg, Bradford, Pa., assignor to S. R. Dresser Manufacturing Company, Bradford, Pa., a corporation of Pennsylvania Application February 7, 1930. Serial No. 426,494

1 Claim. (Cl. 285—108)

My invention consists in the novel features hereinafter described, reference being had to the accompanying drawing which illustrates one form in which I have contemplated embodying my invention, and a slight modification thereof, and said invention is fully disclosed in the following description and claim.

Where it is desired to attach a main gas line and connect thereto a branch pipe of smaller diameter, it is customary practice in the gas industry to employ what is known as a saddle. This comprises three parts, the saddle proper or main body, comprising a block of metal, usually cast iron, having a curved inner face to engage the side wall of the main line pipe section, and provided with a centrally threaded aperture to receive the branch pipe, and having apertures to receive the ends of yokes or bails for attaching the saddle to the pipe, and a gasket to be interposed between the inner face of the saddle and the main line pipe wall to make a tight joint therewith. After the saddle is attached to the main line pipe a hole is bored therein concentric with the branch pipe hole in the saddle, and the branch pipe is screwed into the threaded pipe aperture of the saddle. Owing to the fact that liquid carried by the main pipe line, or condensed from gas carried thereby, has the tendency to decompose or injuriously affect rubber and other materials, which might otherwise be conveniently used for the gaskets, it has been customary to employ gaskets of lead surrounding the pipe aperture in the saddle, which gaskets are compressed by the tightening of the bails so as to make a gas-tight joint between the saddle and the main line pipe, the lead gaskets not being injuriously affected by liquids in the pipe line. It has been found, however, that the lead saddle gasket is subjected to a serious disadvantage, in that it is not elastic, and after a branch line has been so connected and subjected to the action of wide variations of temperature, and especially to the action of frost, which has heaved or raised the pipes and altered their original relative positions, the lead saddle gaskets do not have the necessary resiliency to accommodate these changes of condition or position, and frequently leak.

According to my present invention I employ a gasket of elastic material preferably of rubber or rubber composition having a central aperture, preferably slightly larger than the threaded aperture in the saddle and having its inner marginal portions protected by a covering which is not affected by any liquid carried by or deposited within the pipe line. I have found it desirable to use lead for the protecting covering, and preferably it is used in integral sheet form and extends on opposite faces of the inner marginal portions of the gasket and around the inner peripheral edge of the same, and the marginal portions of the rubber enclosed by the lead covering are preferably made of reduced thickness so that the protected portions will be of no greater thickness after the lead covering is applied than other portions of the gasket.

I may also provide means for preventing injury to the lead covering and the enclosed portions of the rubber, by providing that they shall not receive quite as much compression as the other portions of the gasket on which I rely, principally for effecting a tight joint. This may be accomplished either by making the main body of the gasket of greater thickness than the protected edge, or by providing an annular recess in the saddle block (or other compressing surface) corresponding with the width of the protected edge portion of the gasket, so that while the main body of the gasket will be very highly compressed, the lead enclosed inner marginal portions will be subjected to less pressure, merely sufficient to bring the opposite lead faces into sealing contact with the opposed clamping faces. The gasket can also be used in other relations than between a saddle block and a pipe section, as in pipe unions and other couplings where their use would be desirable.

In the drawing,

Fig. 1 represents a partial view, partly in section, of a saddle and pipe section showing the gasket in compressed condition therebetween.

Fig. 2 is a plan view of the gasket.

Fig. 3 is a sectional view of the same.

Fig. 4 is a partial sectional view showing a modification of the saddle block and gasket, applied to a pipe section, before the saddle is tightened.

Fig. 5 is a similar view showing the saddle tightened.

Fig. 6 is a view similar to Fig. 4, showing a modified form of gasket.

Fig. 7 is a view similar to Fig. 6 after the saddle is tightened.

In Figs. 1, 2 and 3, 1, represents a saddle block provided with a central threaded aperture 2, to receive a branch pipe. 3 and 4 represent the end portions of one of the yokes extending around the pipe section 5, and through suitable apertures 6, in the ends of the saddle block, and provided with clamping nuts 7. 8 represents the gasket shown in detail in Figs. 2 and 3, having its main body composed of rubber or other suitable elastic material and having its inner marginal portions 9, (which are preferably reduced in thickness as shown) provided with a protecting covering 10, formed preferably integrally, of sheet lead lying on opposite faces of the inner marginal elastic portions 9, and around the inner peripheral edge thereof.

The gasket is shown in compressed condition in Fig. 1 between the saddle block 1, which may be provided with a recess 1a, to receive it as shown, or need not have such a recess, as desired. The pipe is shown as having had the aperture 5a, bored therein after the saddle had been tightened on its exterior, after which the branch pipe was screwed into the threaded aperture 2, in the saddle.

It will be seen that the elastic body portions of the gasket will accommodate all changes in the position of the saddle block and pipe 5, without leaking, and that the lead protecting covering for the inner marginal portions, which is maintained by the enclosed compressed rubber in sealing engagement with the opposed clamping faces, will protect the gasket effectively from any liquid in or which may be deposited within the pipe line. It will be understood that the outer peripheral wall of the recess 1a, prevents any material cold flow of the rubber, in a radial direction outwardly, while the annular lead protecting covering tends to prevent any cold flow of the rubber in a radial direction inwardly, and as rubber is elastic the pressure exerted on the portions of the rubber which are not enclosed will be equalized with the portion within the lead protecting covering so as to exert a corresponding pressure outwardly, and thus maintains the portions of the lead on opposite sides of the rubber in firm contact with the opposed clamping faces, and accommodates slight changes in their relative positions without affecting the sealing engagement of the lead covering or of the unenclosed rubber with said opposed faces.

In Figs. 4 and 5 I have shown the saddle block 101, provided with an annular recess 101a, immediately surrounding the threaded pipe aperture 102, which receives the pipe 103, the gasket and other parts shown in Figs. 1 to 3 being given the same reference numerals with the addition of 100. The recess 111 which is preferably formed as a subrecess in the bottom of the recess 101a, is of a width to accommodate the lead covered portion of the gasket so that when the saddle is tightened, as shown in Fig. 5, the leaded marginal portions will be brought into sealing contact with the saddle and pipe without danger of splitting the protecting covering, or injuring the enclosed rubber marginal portions.

In Figs. 6 and 7, in which the parts corresponding with those in Figs. 1 to 3, are given the same reference numerals, with the addition of 200, I have shown another slight modification in which the elastic main body of the gasket, exterior to the portion enclosed within the protecting covering, is of greater thickness than the protected inner marginal portion. This produces the same effect, as indicated in Fig. 7, in which the saddle block is shown tightened, and in which the rubber main body is compressed to a greater extent than the marginal portions, the opposite lead faces of which are given only sufficient compression to bring them into sealing contact with the opposed clamping faces without danger of injury to the protecting covering or the portion of the elastic material enclosed thereby.

The elasticity of the main body of the gasket will keep it tight under practically all changes of condition or position of the opposed clamping parts and even if the saddle has a tendency to turn slightly on the pipe while the gasket is fully protected at its inner edge from injurious effects from any liquid in the line.

What I claim and desire to secure by Letters Patent is:—

The combination with opposed apertured clamping surfaces, one of which is provided with a gasket receiving recess coaxial with the aperture therein, and an annular subrecess at the inner edge of the bottom of the gasket receiving recess, of a flat annular gasket of rubber, having its outer periphery fitting the outer peripheral wall of said recess and being thereby restrained from outward radial cold flow, the said gasket being provided with a yielding protecting covering of lead extending around its inner periphery and having parallel portions on opposite faces of the adjacent marginal portions of the gasket, and preventing cold flow in a radial direction inwardly, said covering being coaxial and coextensive with the said subrecess, the pressure upon the unenclosed portions, as well as the enclosed portions of the gasket by the clamping surfaces, causing the enclosed portions of the gasket to exert outward pressure on the parallel portions of the lead covering to maintain it in sealing engagement with said surfaces and compensate for variations in the relative positions thereof.

GROVER SEABERG.